US010115205B2

(12) United States Patent
Cavin et al.

(10) Patent No.: US 10,115,205 B2
(45) Date of Patent: Oct. 30, 2018

(54) EYE TRACKING SYSTEM WITH SINGLE POINT CALIBRATION

(71) Applicant: Oculus VR, LLC, Menlo Park, CA (US)

(72) Inventors: Robert Dale Cavin, Kirkland, WA (US); Warren Andrew Hunt, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 48 days.

(21) Appl. No.: 15/456,383

(22) Filed: Mar. 10, 2017

(65) Prior Publication Data

US 2017/0263007 A1 Sep. 14, 2017

Related U.S. Application Data

(60) Provisional application No. 62/306,777, filed on Mar. 11, 2016.

(51) Int. Cl.
| | |
|---|---|
| *G06K 9/00* | (2006.01) |
| *G06T 7/246* | (2017.01) |
| *G06F 3/01* | (2006.01) |
| *G06T 7/564* | (2017.01) |
| *G06T 7/73* | (2017.01) |

(Continued)

(52) U.S. Cl.
CPC .............. *G06T 7/251* (2017.01); *G06F 1/163* (2013.01); *G06F 1/1637* (2013.01); *G06F 1/1686* (2013.01); *G06F 3/013* (2013.01); *G06K 9/00597* (2013.01); *G06T 7/564* (2017.01); *G06T 7/60* (2013.01); *G06T 7/75* (2017.01); *G06T 2207/10152* (2013.01)

(58) Field of Classification Search
CPC ........... G06T 7/251; G06T 7/564; G06T 7/75; G06T 7/60; G06T 2207/10152; G06F 3/013; G06F 1/163; G06F 1/1637; G06F 1/686; G06K 9/00597
See application file for complete search history.

(56) References Cited

U.S. PATENT DOCUMENTS

| | | | |
|---|---|---|---|
| 5,975,701 A | * | 11/1999 | Takagi ................. A61B 3/1005 351/221 |
| 7,401,920 B1 | | 7/2008 | Kranz et al. |
| 7,542,210 B2 | | 6/2009 | Chirieleison, Sr. |

(Continued)

OTHER PUBLICATIONS

PCT International Search Report and Written Opinion, PCT Application No. PCT/US2017/021956, dated Jun. 9, 2017, 17 pages.

*Primary Examiner* — Amir Alavi
(74) *Attorney, Agent, or Firm* — Fenwick & West LLP

(57) ABSTRACT

A head mounted display (HMD) comprises an eye tracking system configured to perform a calibration process using an eye tracking system of the HMD that includes determining a pupillary axis and/or determining an angular offset between the pupillary axis and the eye's true line of sight. The eye tracking system obtains an eye model captures images of the user's pupil while the user is looking at a target or other content displayed on the HMD. In some embodiments, the calibration process is based on a single image of the user's eye and is performed only once. For example, the process can be performed the first time the user uses the HMD, which stores the calibration data for the user in a memory for future use.

20 Claims, 6 Drawing Sheets

(51) Int. Cl.
*G06T 7/60* (2017.01)
*G06F 1/16* (2006.01)

(56) References Cited

U.S. PATENT DOCUMENTS

| | | | |
|---|---|---|---|
| 2002/0159028 A1* | 10/2002 | Masaki | A61B 3/152 |
| | | | 351/200 |
| 2011/0205486 A1* | 8/2011 | Zhao | A61F 2/1613 |
| | | | 351/159.21 |
| 2015/0009574 A1 | 1/2015 | Liesecke et al. | |
| 2016/0011658 A1 | 1/2016 | Lopez et al. | |
| 2016/0070107 A1 | 3/2016 | Bickerstaff et al. | |
| 2016/0134863 A1* | 5/2016 | Horesh | H04N 17/002 |
| | | | 348/78 |
| 2017/0261610 A1* | 9/2017 | Scally | G01S 15/42 |
| 2017/0263007 A1* | 9/2017 | Cavin | G06T 7/251 |
| 2017/0293794 A1* | 10/2017 | Tsurumi | G06K 9/0061 |
| 2018/0033405 A1* | 2/2018 | Tall | G09G 5/37 |

\* cited by examiner

EYE TRACKING SYSTEM WITH SINGLE POINT CALIBRATION

CROSS-REFERENCE TO RELATED APPLICATIONS

This application claims the benefit of U.S. Application No. 62/306,777, filed Mar. 11, 2016 which is incorporated by reference in its entirety.

BACKGROUND

The present disclosure generally relates to eye tracking, and specifically to an eye tracking system with a single point calibration.

Eye tracking is an important feature for head-mounted display (HMD) systems including systems used in virtual reality (VR) applications. Calibration of such tracking systems is important for accuracy of the data reported by HMD systems. Conventionally, calibration of HMD systems involved a significant calibration process and typically required calibration of the tracking system before every use by the user, which reduces user experience. For example, conventional calibration processes typically ask the user to look at a sequence of targets before every use. A calibration system that improves user experience by either reducing the number of targets the user has to look or reducing the frequency of calibration is useful.

SUMMARY

A calibration process for an eye tracking system includes determining a pupillary axis and/or determining an angular offset between the pupillary axis and the eye's true line of sight for each eye. The eye tracking system obtains an eye model (e.g., either generates itself or receives from external to the eye tracking system) for the eye that includes information of radius and origin of a corneal sphere for each eye, where each eye is approximated as two spheres with one sphere approximating the overall eye and a portion of the other sphere (i.e., corneal sphere) approximating a portion of the cornea. The calibration process includes capturing images of the user's pupil while the user is looking at one or more known targets (e.g., specific points on an electronic display of the VR headset) or while viewing content displayed on the HMD in a normal mode of operation. In one embodiment, a single point calibration is performed where the user only needs to look at one specific target on the electronic display.

The eye tracking system identifies a shape of the pupil in each of the captured images of the user's eye and then uses the identified shape of the pupil along with the obtained eye model information to determine a 3D plane in which the pupil is located. An observable axis is then derived that identifies a ray originating from the 3D plane and is normal to the corneal surface of the corneal sphere. This axis is defined herein as the pupillary axis of the eye. The system may also determine an angular offset between the pupillary axis and the eye's true line of sight (i.e., represented by location of fovea). The system may further determine torsional state of the user's eye or determine user identification by tracking the user's iris along with the determined pupillary axis and/or the angular offset. In some embodiments, the calibration process for determining the pupillary axis and/or the angular offset between the pupillary axis and the user's true line of sight is based on a single image of the user's eye and is performed only once. For example, the calibration process is performed the very first time the user puts the VR headset on and the VR headset stores the calibration data corresponding to the user in a memory for use in future uses by the same user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
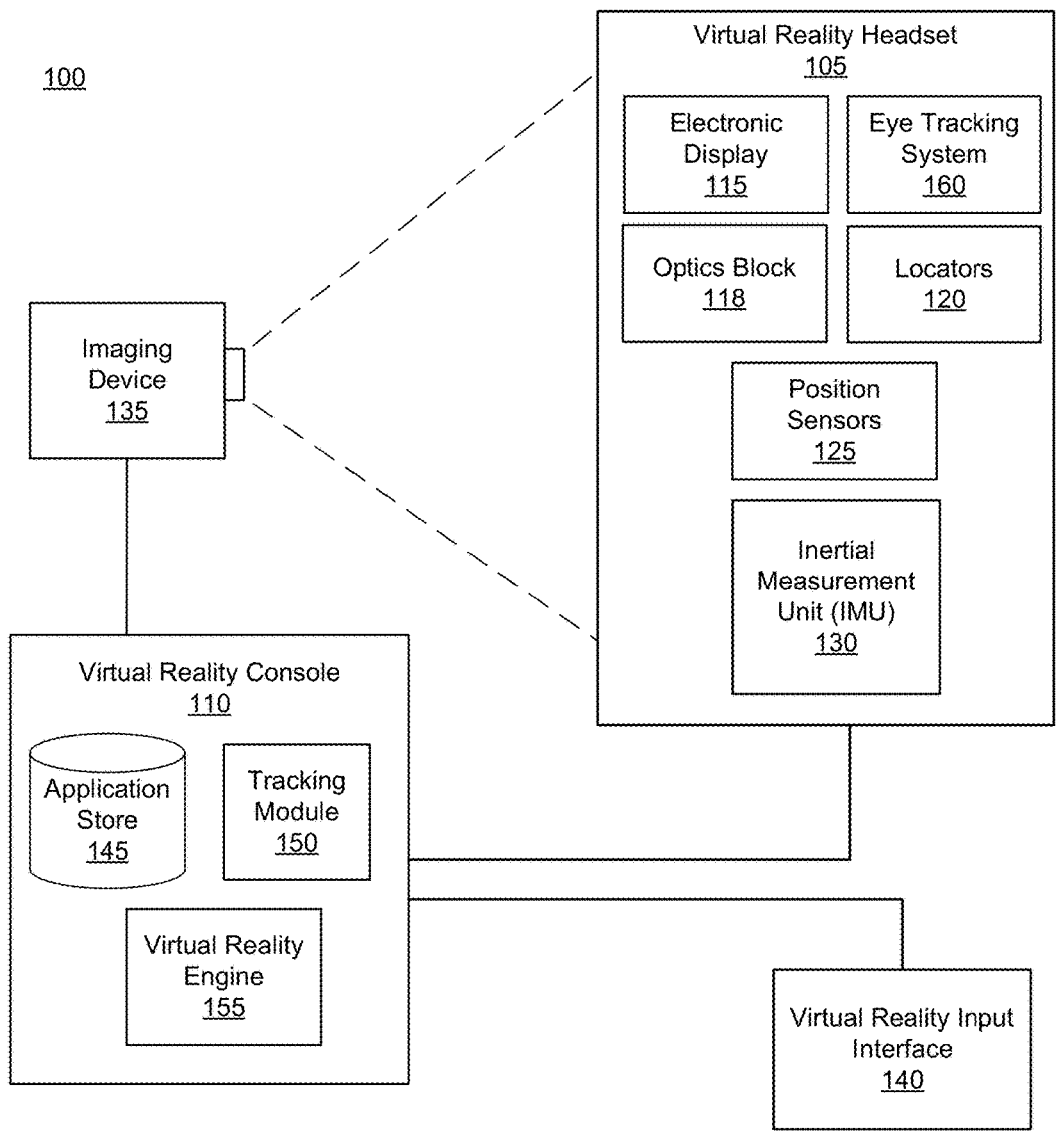
FIG. 1 is a block diagram of a system environment including a VR system, in accordance with an embodiment.

FIG. 1 is a block diagram of a VR system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a HMD that presents content to a user. Examples of content presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, an inertial measurement unit (IMU) 130, and an eye tracking system 160. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical errors in addition to fixed pattern noise (i.e., the screen door effect). Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Figure 4:
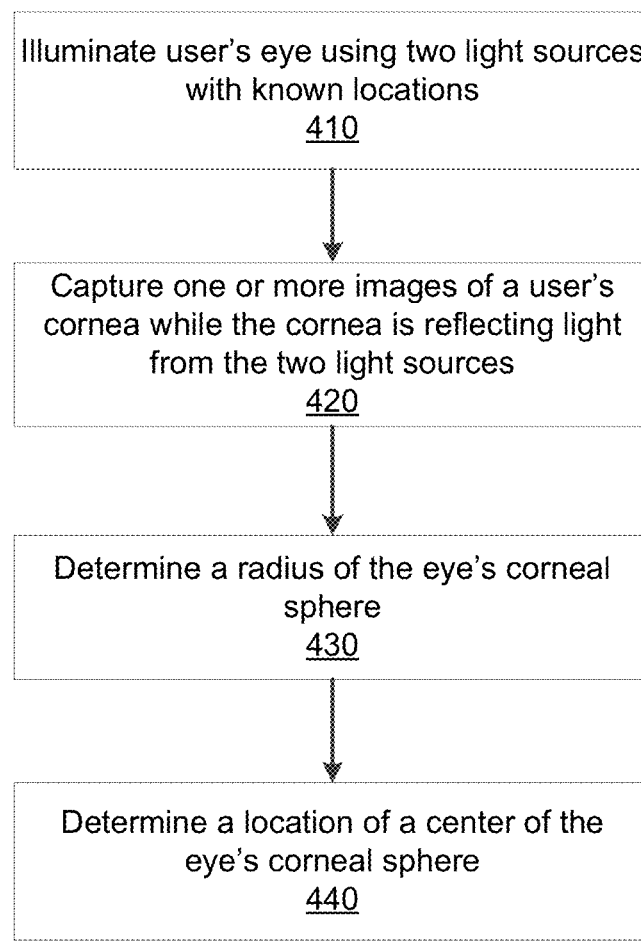
FIG. 4 is a flowchart of an example process for generating an eye model using an eye tracking system, in accordance with an embodiment.

The eye tracking system 160 generates the eye model using an example process described in conjunction with FIG. 4. The eye tracking system 160 includes an eye tracking unit and a control module. The eye tracking unit is located within an HMD system (e.g., VR system 100 or other systems such as an AR system) and includes, among other components, illumination sources and optical sensors. The illumination sources (e.g., point light sources) and optical sensors (e.g., camera) of the eye tracking unit are used for corneal sphere tracking to determine a model of an eye of a user while the user is wearing the HMD (e.g., VR headset 105). The control module may also perform a calibration process for the HMD system to determine a pupillary axis and/or an angular offset between the pupillary axis and the user's true line of sight. The illumination sources and the optical sensors are coupled to the control module that performs the necessary data processing for generating the eye model, performing the calibration of the HMD system, and performing optical actions. The control module is located within the VR headset 105 and/or the VR console 110.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within an application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or the entire system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
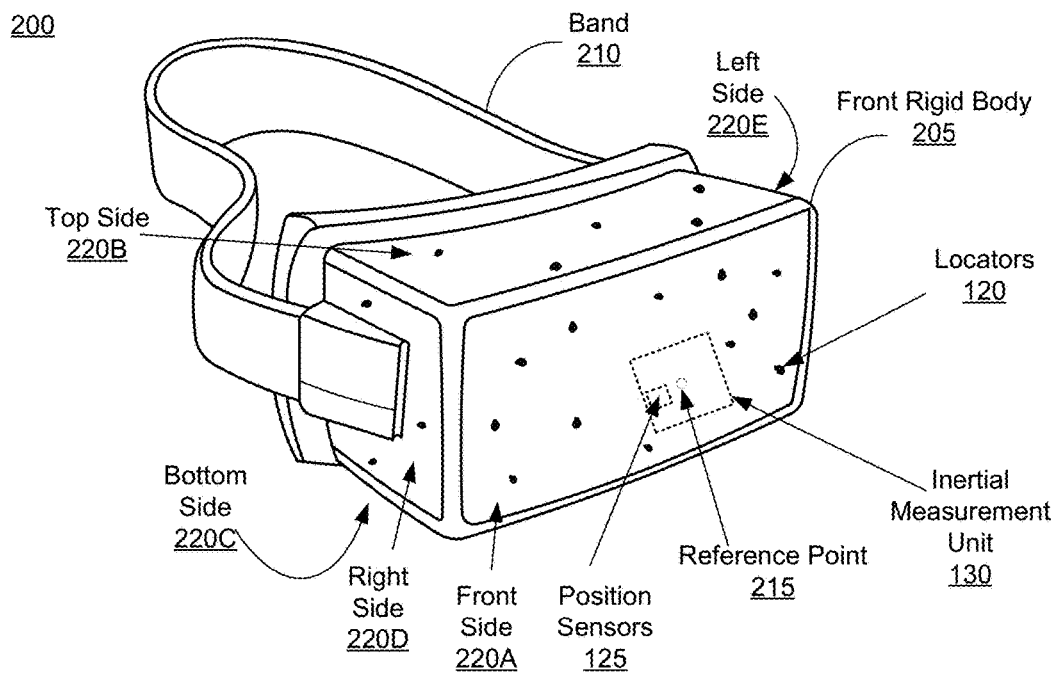
FIG. 2A is a diagram of a VR headset, in accordance with an embodiment.

FIG. 2A is a diagram of a VR headset, in accordance with an embodiment. The VR headset 200 is an embodiment of the VR headset 105, and includes a front rigid body 205 and a band 210. The front rigid body 205 includes the electronic display 115 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
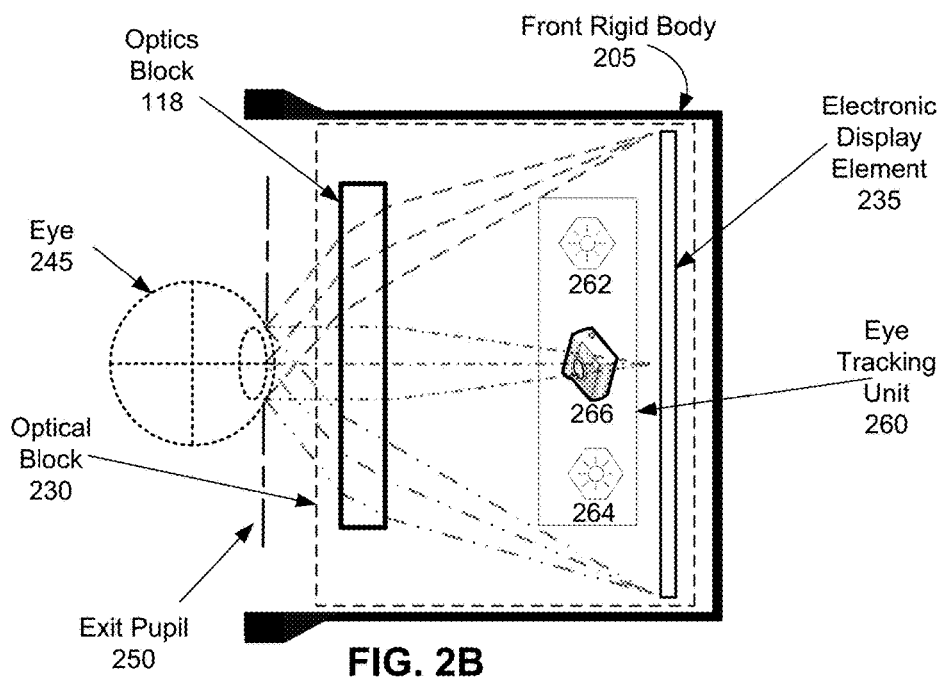
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115, the optics block 118, and an eye tracking unit 260. The electronic display element 235 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

The VR headset 200 includes an eye tracking unit 260 (e.g., the eye tracking unit of the eye tracking system 160 of FIG. 1). The eye tracking unit 260 includes illumination sources and optical sensors. In one embodiment, the eye tracking unit 260, as shown in FIG. 2B, includes two illumination sources 262 and 264, and an optical sensor 266 for each eye. The illumination sources and the optical sensor of the eye tracking unit 260 are coupled to a control module (not shown in FIG. 2B) that performs the necessary data processing for generating the eye model. The control module is located within the VR headset 105 and/or the VR console 110. Also, in some embodiments, there is at least one eye tracking unit 260 for the left eye of the user and at least one eye tracking unit 260 for the right eye of the user.

The illumination sources 262 and 264 and optical sensor 266 are used for corneal sphere tracking of a user's eye. The eye tracking unit 260 is positioned within the optical block 230 such that the optical sensor 266 (e.g., camera) can capture images of the user's eye (and specifically cornea of the eye) over a range of eye motion. The illumination sources 262 and 264 emit light such that when the emitted light reflects off of the user's eye while the user views the emitted light, the optical sensor 266 captures one or more images of the user's eye. The eye tracking unit 260 is positioned within the optical block 230 such that light emitted from the illumination sources 262 and 264 reaches the user's eye through the optics block 118. The eye tracking unit 260 may be positioned either on-axis along the user's vision (e.g., as shown in FIG. 2B) or can be placed off-axis from the user's vision (e.g., to the left of the optics block 118). An example of corneal sphere tracking system is described further below with reference to FIG. 3.

Eye Tracking System for Generating Eye Model

Figure 3:
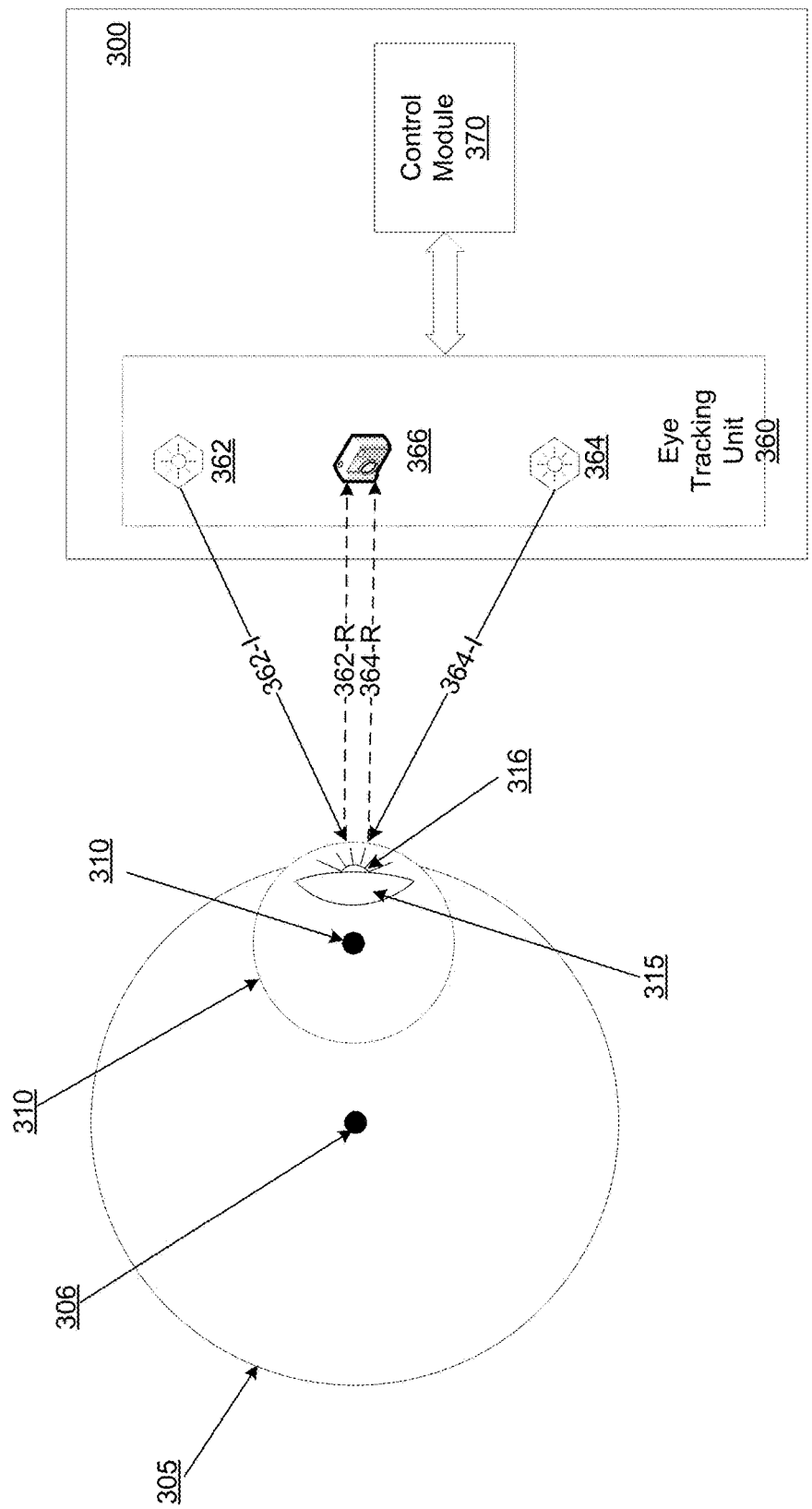
FIG. 3 depicts an example eye tracking system for generating an eye model, in accordance with an embodiment.

FIG. 3 depicts an example eye tracking system 300, in accordance with an embodiment. In some embodiments, the eye tracking system 300 is part of the eye tracking system 160 in the VR headset 105. In alternate embodiments, the eye tacking system 300 is part of some other device, e.g., a heads up display in an AR system, or some other system utilizing eye tracking. The eye tracking system 300 includes, among other components, an eye tracking unit 360 and a control module 370. For simplification, the discussion of the eye tracking system 300 is with regard to a single eye of the user. However, in some embodiments, corresponding eye tracking units 360 may be employed for each of the user's eyes. In such embodiments, a single control module 370 may control the multiple eye tracking units 360.

The eye tracking unit 360 includes, among other components, two or more illumination sources (e.g., illumination sources 362 and 364) and one or more optical sensors (e.g., optical sensor 366). The illumination sources (e.g., point light sources) and optical sensors (e.g., camera) of the eye tracking unit are used for corneal sphere tracking and to determine a model of an eye of a user while the user is wearing the VR headset 105. The illumination sources 362 and 364 have well-known emission characteristics such as ideal point light sources. In one embodiment, two illumination sources are used. Alternatively, more than two illumination sources, such as, a ring of illumination sources are used. For example, the ring of illumination sources can be positioned either in the same two-dimensional plane or arbitrary positions relative to a reference point (e.g., location of an entrance pupil of the HMD or reference point 215). In one embodiment, the illumination sources can be located outside of the user's line of sight. Illumination sources positioned arbitrarily from the reference point can be placed at different depths from the reference point and/or at non-uniform spacing between the sources to improve the accuracy of the eye tracking.

In some embodiments, the two or more illumination sources comprise different characteristics for either all of the illumination sources or between the illumination sources. For example, light originating from the two or more illumination sources can include one or more of: different wavelengths, modulated at different frequencies or amplitudes (i.e., varying intensity), have different temporal coherence that describes the correlation between the two light waves at different points in time, and multiplexed in either time or frequency domain.

The optical sensor 366 captures images of the user's eye to capture corneal reflections (e.g., reflections from cornea of the eye). For example, the optical sensor 366 is a camera that can capture still pictures or video. The optical sensor 366 has a plurality of parameters such as focal length, focus, frame rate, ISO, sensor temperature, shutter speed, aperture, resolution, etc. In some embodiments, the optical sensor 366 has a high frame rate and high resolution. The optical sensor 366 can capture either two-dimensional images or three-dimensional images. The optical sensor 366 is placed such that the corneal reflections in response to the light from the illumination sources incident upon the eye can be captured over a range of eye movements (e.g., a maximum possible range). For example, when a ring of illumination sources are placed around the eye, the optical sensor 366 is placed pointed towards the eye around the center of the ring (e.g., in the line of sight of the user). Alternatively, the optical sensor 366 is placed off-axis such that it is outside of the main line of sight of the user. In one embodiment, more than one optical sensor 366 can be used per eye to capture corneal reflections of the eye while light from illumination sources is incident upon the eye. The optical sensor 366 may be a detector that can measure a direction of corneal reflections such as column sensors, waveguides, and the like.

The illumination sources 362 and 364 emit light that is reflected at the cornea, which is then captured (e.g., as an image) at the optical sensor 366. For example, light rays represented by arrows 362-I and 364-I originating at the illumination sources 362 and 364 are incident upon the eye. When light is incident upon the human eye, the eye produces multiple reflections such as a reflection from the outer surface of the cornea and another reflection from the inner surface of the cornea. In one embodiment, the optical sensor 366 captures the reflected light from the outer surface of the cornea in the captured images. For example, reflected light represented by arrows 362-R and 364-R is captured in images captured by the optical sensor 366. Alternatively or additionally, the optical sensor 366 captures the reflected light from the inner surface of the cornea. The reflections from the cornea (e.g., from inner surface and/or outer surface) are herein referred to as corneal reflections. An example process of generating an eye model using corneal sphere eye tracking is further described below with reference to FIG. 4.

The control module 370 generates eye models, performs calibration of the HMD system, and performs optical actions. For example, the control module 370 performs the process to generate an eye model for one or both of a user's eyes. In some embodiments, a single control module 370 may control the multiple eye tracking units 360 such as one eye tracking unit 360 for the left eye and another eye tracking unit 360 for the right eye. The control module 370 is located within the VR headset 105 and/or the VR console 110. The control module 370 is coupled with the eye tracking unit 360 such that the illumination sources 362 and 364, and optical sensor 366 can communicate with the control module 370.

An example process for generating an eye model, described below in conjunction with FIG. 4, includes the steps of turning on the illumination sources 362 and 364, capturing images including corneal reflections at the optical sensor 366 while the user is viewing known locations on the VR headset 105, and further processing of the captured images to generate an eye model. An example calibration process, described below in conjunction with FIG. 6, includes capturing images with corneal reflections and processing the captured images to determine a 3D plane where the pupil of the eye resides and a pupillary axis for the eye. The calibration process may also include determining an angular offset between the pupillary axis and the eye's true line of sight. The control module 370 may also perform one or more optical actions such as determining a user's gaze direction, a user's vergence angle (or vergence depth), a user's accommodation depth, identification of the user, an eye's torsional state, or some combination thereof.

The eye tracking system 300 generates a model for the user's eye. In one embodiment, the user's eye is modeled as two spheres 305 and 310 of different radii, where sphere 305 approximates the overall eye and a portion of sphere 310 approximates the cornea of the eye. The center (or origin) of the sphere 305 is represented by point 306 and the center of corneal sphere 310 is represented by point 311. Element 315 represents the lens of the eye and element 316 represents the pupil of the eye. In other embodiments, the cornea may be modeled as a complex surface.

The human eye can be modeled using two spheres with a bigger sphere (i.e., sphere 305) representing an approximation of the overall eye and a smaller sphere (i.e., sphere 310) representing an approximation of a portion of the cornea of the eye, where the two spheres have different radii and their centers are offset from each other. While it is known that the cornea forms only a small curved portion in the eye and is not a sphere in and off itself, the cornea can be approximated as a portion of a sphere. In one embodiment, the sphere 305 has a radius of approximately 25 mm and corneal sphere 310 has a radius of approximately 8 mm. The centers of the sphere 305 and sphere 310 are offset from each other as shown in FIG. 3. When the eye rotates while viewing content on a head mounted display (e.g., a VR headset 105), the rotation of the eye causes a corresponding displacement of the center of the corneal sphere 310 (i.e., point 311). The tracking system 300 tracks the motion of the center of the corneal sphere 310 during the rotation of the eye. In some embodiments, the eye tracking system 300 generates a model for a single eye of the user as described below in conjunction with FIG. 4. The generated eye model includes eye information including but not limited to radius and origin information for the corneal sphere 310, which is referred to herein as "eye model information." Alternatively or additionally, the eye model information may include radius and origin information of the sphere that approximates the overall eye (i.e., sphere 305). In one embodiment, the corneal motion may be modeled as a rotation about the fixed center 306 of sphere 305. In other embodiments, the center 306 of sphere 305 is a function of the cornea position (modeling aspheric eye shapes, oculomotor muscle control, deformation under rotation, etc.). The generated eye model information is stored in a database located within the system environment 100 or outside of the system environment 100.

The control module 370 uses the stored eye models to perform one or more optical actions (e.g., estimate gaze direction for one or both eyes of the user) in the normal mode of operation while the user is viewing content. The control module 370 receives eye tracking information from the eye tracking unit 360 along with the eye model information to perform optical actions such as determining a user's gaze direction, determining a user's vergence angle (or vergence depth), a user's accommodation depth, identification of the user, an eye's torsional state, or some combination thereof. The control module 370 can be implemented in either hardware, software, or some combination thereof.

FIG. 4 is a flowchart of an example process 400 for generating an eye model using an eye tracking system (e.g., eye tracking system 300 of FIG. 3), in accordance with an embodiment. The example process 400 of FIG. 4 may be performed by the eye tracking system 300, e.g., as part of a VR headset 105 and/or the VR console 110, or some other system (e.g., an AR system). Other entities may perform some or all of the steps of the process in other embodiments. Likewise, embodiments may include different and/or additional steps, or perform the steps in different orders. The example process of FIG. 4 is for generating an eye model for one of the user's eyes and can also be implemented (either concurrently or sequentially) for determining an eye model for the user's other eye. The example process is described using two illumination sources and one optical sensor for modeling the eye. An eye model can be generated using more than two illumination sources and/or more than one optical sensor.

The eye tracking system 300 illuminates 410 the user's eye by turning on two illumination sources (e.g., illumination sources 362 and 364) that are positioned at known locations relative to, e.g., an optical sensor (e.g., optical sensor 366). These illumination sources emit light that is incident on the user's eye such that the cornea of the eye reflects the light.

The eye tracking system 300 captures 420 corneal reflections of the light incident upon the user's eye as one or more images. In one embodiment, the eye tracking system 300 captures a single image of the corneal reflections. Alternatively, the eye tracking system 300 captures multiple images of corneal reflections as the user looks at a sequence of known targets (e.g., specific points on the electronic display 235).

The eye tracking system 300 generates a model of the eye, where the eye model includes radius and origin information for the corneal sphere 310. The captured one or more images including corneal reflections of light originating from the two illuminations sources at known locations results in a single corneal radius and a corneal sphere origin that fits the data of the captured images. In one embodiment, the eye tracking system 300 generates the eye model by using a corneal learning model that uses a reference eye. The reference eye, as referred to herein, is an eye with a reference eye model that includes known radius and origin information for each of corneal sphere (e.g., sphere 310) and the sphere representing the overall eye (e.g., sphere 305). The corneal learning model includes capturing the corneal reflections of the reference eye while the reference eye is rotated to emulate a range of human eye movements. The corneal learning model includes the relationship between various movements of the reference eye and the corneal reflections of the reference eye, and such relationship is used to generate the eye model for the user's eye. For example, the corneal reflections of the user's eye captured in step 420 are compared with that of the corneal reflections of the reference eye to extrapolate different parameters for the eye model (e.g., radius and origin) for the corneal sphere 310 of the user's eye. In such example, the radius and origin information of the reference eye model of the corneal learning model is extrapolated to estimate radius and origin information for the user's eye model. An example method of estimating the radius and origin for the user's eye model is described below.

The eye tracking system 300 determines 430 a radius of the corneal sphere 310 based on the captured images that include corneal reflections of at least two of the illuminating sources. Each image provides sufficient information to derive an estimate of the corneal radius and corneal position. In some embodiments, the eye model may include only a sphere of fixed radius for the cornea. The corneal radius estimate may then be refined by combining estimates over a sequence of frames using an appropriate statistical model. For example, the samples of corneal radius may form a normal distribution about the mean over a sequence of images. When a sequence of images provides a set of estimations with a low variance around the mean with few outliers, the corneal radius could be assumed to be the mean of these samples. In embodiments with three or more illumination sources, the difference in corneal radius predicted by each set of two illumination sources may be used to inform a non-spherical model for the corneal surface (ex. b-splines, polynomial surface, etc.). In yet other embodiments, the difference in corneal radius predicted in a set of frames may be combined with a predicted gaze direction per frame to inform a more complex corneal model. In these systems, the cornea is defined by the reference origin 311 and an orientation.

The eye tracking system 300 determines an effective center 306 of eye rotation and a distance separating the eye rotation center and the cornea center (e.g., a distance between centers 306 and 311). In one implementation, the eye center 306 may be assumed to be a fixed point. In this system, the user may be presented with visual targets on the electronic display element 235 presented at known angular offsets from a reference position. For example, the target may be placed at a distance approaching infinity with the desired angular deviation in a distortion-corrected virtual rendered space of the HMD. The distortion-corrected virtual rendered space is a computer-generated three-dimensional representation of content on the electronic display element 235 to a user of the HMD, where the displayed content is corrected for distortion-based optical errors. The eye tracking system 300 determines and records 440 a location of the corneal sphere while the user is looking toward each of these calibration targets. This system may model the user's gaze as lying along the vector from the eye center 306 through the corneal center 311. The position of the eye center 306 and orientation of the eye to the virtual rendered space of the HMD may be inferred as the point 306 and orientation that best satisfies the assumption that the distance 306 to 311 remains unchanged and that the gaze vectors from 306 to recorded corneal centers 311 align most closely with the presented target angular offsets. In other systems, the precise eye center 306 may be modeled as a function of cornea position (and/or cornea orientation in more complex models) for the purpose of gaze estimation to model physiological deviations from a spherical eye model.

The generated eye model can be used in part to perform one or more optical actions such as determining a user's gaze direction, a user's vergence angle (or vergence depth), a user's accommodation depth, identification of the user, an eye's torsional state, or some combination thereof. For example, a determination of where the user is looking at (i.e., user's gaze) is done using the eye model of the user. The user's gaze can be determined by determining a pupillary axis of the eye at a given time point, and further determining an offset angle between the eye's pupillary axis and its line of sight, where the line of sight is indicated by the location of the fovea that is responsible for the eye's sharp central vision. The pupillary axis and the offset angle can be determined during a calibration of the HMD system as described below with reference to FIG. 5.

One-Time Single Point Calibration

Figure 5:
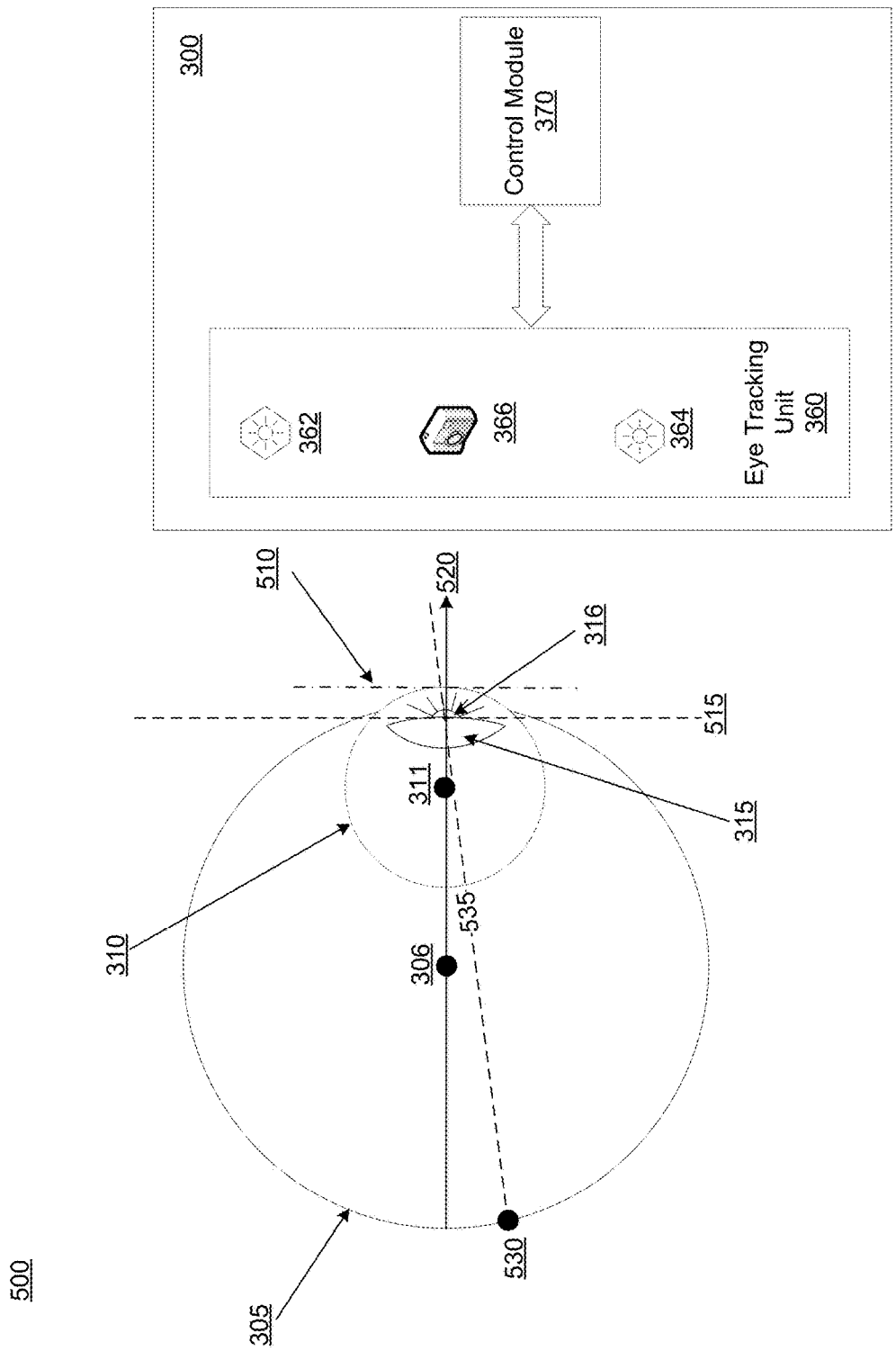
FIG. 5 depicts an example one-time single point calibration for an HMD system, in accordance with an embodiment.

FIG. 5 depicts an example one-time single point calibration for an HMD system (e.g., VR system 100 including the VR headset 105) performed by an eye tracking system (e.g., eye tracking system 300), in accordance with an embodiment. The eye tracking system depicted and described in FIG. 5 is identical to the eye tracking system 300 described above in conjunction with FIG. 3. The example calibration system of FIG. 5 is described for calibrating one of the user's eyes and can also calibrate (either concurrently or sequentially) the user's other eye. In some embodiments, the calibration includes determining a pupillary axis for each eye and/or determining an angular offset between the pupillary axis and the eye's true line of sight. In some embodiments, the calibration of the HMD system is based on a single image of the user's eye and is performed only once. For example, the calibration is performed the very first time the user puts the VR headset 105 on and the VR headset 105 stores the calibration data corresponding to the user in a memory for future uses by the same user.

FIG. 5 shows an eye of a user, similar to as shown in FIG. 3, modeled as two spheres 305 and 310 of different radii, where sphere 305 approximates the overall eye and a portion of sphere 310 approximates the cornea of the eye. The center of the sphere 305 is represented by point 306 and the center of corneal sphere 310 is represented by point 311. Element 315 represents the lens of the eye and element 316 represents the pupil of the eye. The pupil is a circular opening in the center of the iris of the eye that allows light to strike the retina. FIG. 5 also shows a 3D plane 515 at which the pupil 316 resides and a ray 520 originating from the 3D plane 515 that is perpendicular to the corneal surface 510 of corneal sphere 310. The ray 520 represents the pupillary axis of the eye, which is determined by a calibration process described below in conjunction with FIG. 6.

The control module 370 performs the calibration for the HMD system. The calibration includes determining a 3D plane where the pupil resides and a pupillary axis for the eye. The 3D plane described herein is a plane in the three-dimensional space where the pupil resides. The three-dimensional space is defined relative to a reference point such as, for example, the location of the optical sensor 366. The calibration includes capturing images of the eye with corneal reflections and processing the captured images to identify a shape of the pupil that can range from a circle (in an on-axis viewing position of the eye) to complex shapes when viewing the pupil through the refractive cornea of an eye rotated off-axis from the camera. For example, the shape of the pupil can be identified by determining a border between the pupil (typically black in color) and the iris (typically either brown, hazel, green, gray, or blue, or some combination thereof) by looking for a change in reflected intensity at one or more light wavelengths associated with the pupil and iris of the eye. The 3D plane is determined using the identified pupil shape and the eye model information.

In one embodiment, the pupil's 3D plane is identified by modifying the identified pupil shape based on a predicted amount of eye rotation from an on-axis viewing position of the eye. As discussed above in conjunction with FIG. 2B, the pupil shape is a circle in an on-axis viewing position of the eye. An example method for determining predicted amount of eye rotation is based on a pupil learning model, where the pupil shapes of the reference eye with the reference eye model (i.e., reference eye and reference eye model described above in conjunction with FIG. 4) is captured while the eye is rotated to emulate a range of human eye movements. By learning the relationship between various movements of the reference eye and the identified pupil shapes (e.g., various kinds of ovals), a 3D plane for the user's pupil can be estimated for any pupil shape that is captured while the user is viewing content on the VR headset 105. In one embodiment, the identified 3D plane is modified to take into account the differences between the reference eye model used in the pupil learning model and the obtained eye model for the user's eye. For example, the radius and origin of the corneal spheres of the reference eye model used in the pupil learning model and that of the obtained eye model of the user are compared to modify the location of the pupil's identified 3D plane.

In some embodiments, the control module 370 determines an angular offset between the determined pupillary axis (i.e., identified by ray 520) and the user's true line of sight represented by the location of the eye's fovea region. In FIG. 5, the location of the center of the eye's foveal centralis region is represented with point 530 and the eye's true line of sight is represented with the line 535 the connects the center of the fovea 530 and the pupil 316. The eye's fovea is responsible for the eye's true line of sight (also called as sharp central vision or foveal vision). The fovea is a small, central pit composed of closely packed cones in the eye and is located on the retina. There is an angular offset between the pupillary axis 520 and the eye's true line of sight because the location of the fovea doesn't align with the pupillary axis 520 if the pupillary axis 520 is extended back to the retina.

The pupillary axis 520 and the offset angle can be determined during the calibration of the HMD system. In one embodiment, the user is asked to fixate on a target that is presented to the user at a known direction via the VR headset 105's display. While the user is looking at the target, one or more images of the user's eye are captured to capture the shape of the pupil. As the location of the user's eye is known (e.g., eye model information with corneal sphere radius and origin, and/or 3D plane and pupillary axis providing location of the pupil) and the direction of the presented target is also known, the user's line of sight while viewing the target is determined. For example, the user's line of sight is determined by a line that parallels the direction of the target and the known location of the pupil in a 3D space relative to a reference point such as the location of optical sensor 366, which is referenced to the coordinate system of the HMD.

The control module 370 estimates a predicted amount of rotation the user's eye would make from an on-axis position (i.e., a position of the eye that results in a circular pupil shape at the optical sensor 366 for a given position of the optical sensor 366) to a position to view the target on the display by using the pupil learning model and the user's eye model information (e.g., user's eye model generated as described above in conjunction with FIG. 4). From the captured one or more images of the pupil while the user is fixated on the target, a shape of the pupil is identified (e.g., an oval shape). Using the pupil learning model for the reference eye, the control module 370 estimates a predicted amount of rotation for the reference eye for the identified shape of the pupil. The control module then applies a correction factor to the estimated predicted amount of rotation to factor in the difference between the reference eye model and the user's eye model. The corrected amount of predicted eye rotation is then applied to the pupillary axis 520 of the user's eye to determine a location of the modified pupillary axis that corresponds to the scenario when the user is fixated at the target. An angular delta between the modified pupillary axis and the user's line of sight when the user is fixated at the target location represents an angular offset between the pupillary axis 520 and the eye's true line of sight. An example process for calibrating the HMD system including determining a pupillary axis and/or an angular offset between the pupillary axis and the user's true line of sight is described below with reference to FIG. 6.

Figure 6:
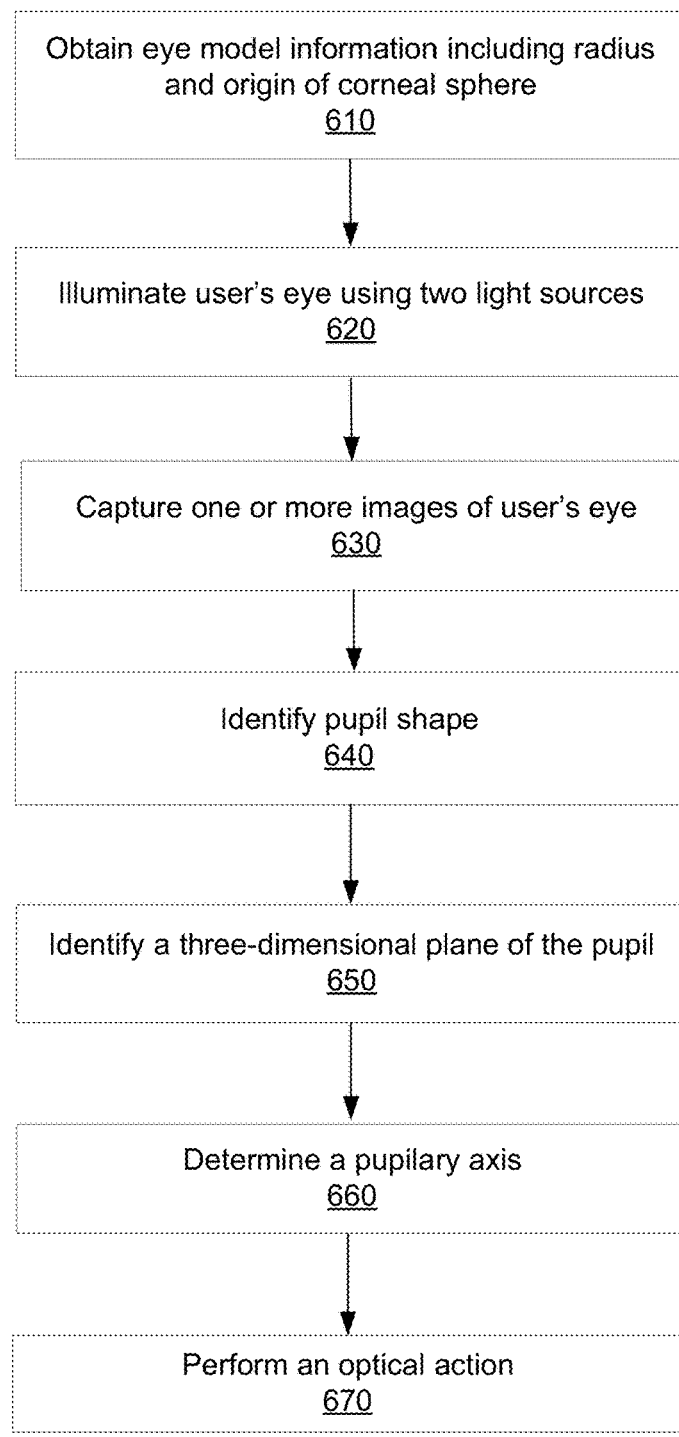
FIG. 6 is a flowchart of an example process for a one-time single point calibration of an HMD system, in accordance with an embodiment.

FIG. 6 is a flowchart of an example process 600 for a one-time single point calibration of an HMD system (e.g., VR system environment 100 including the VR headset 105 or an AR system including an AR headset), in accordance with an embodiment. The example calibration process 600 of FIG. 6 may be performed by the eye tracking system 300, e.g., as part of the VR headset 105 and/or the VR console 110 or some other system (e.g., an AR system). Other entities may perform some or all of the steps of the process in other embodiments. Likewise, embodiments may include different and/or additional steps, or perform the steps in different orders. The calibration process of FIG. 6 is for calibrating the HMD system for one of the user's eyes and can also be implemented (either concurrently or sequentially) for calibrating the HMD system for the user's other eye. In some embodiments, the calibration process 600 is performed only once. For example, the calibration process 600 is performed the very first time the user puts the VR headset 105 on and the VR headset 105 stores the calibration data corresponding to the user in a memory for use in future uses by the same user.

The eye tracking system 300 obtains 610 eye model information including radius and origin information of corneal sphere 310 of the user's eye. In one embodiment, the eye tracking system 300 obtains the eye model information from within the eye tracking system 300 (e.g., eye tracking system 300 generates the eye model as described above in conjunction with FIG. 4). Alternatively, the eye tracking system 300 obtains the eye model information external to the eye tracking system 300 (e.g., VR console 110 or outside of system environment 100).

The eye tracking system 300 illuminates 620 the user's eye by turning on two illumination sources (e.g., illumination sources 362 and 364) that are positioned at known locations relative to, e.g., an optical sensor (e.g., optical sensor 366). These illumination sources emit light that is incident on the user's eye such that the cornea of the eye reflects the light.

The eye tracking system 300 captures 630 one or more images of a user's cornea (i.e., corneal reflections). The images capturing the corneal reflections are very similar to those described above in conjunction with FIG. 4. In one embodiment, the eye tracking system 300 captures 630 one or more images while the user is looking at one or more known targets (e.g., specific points on the electronic display 235). For example, a single point calibration is performed where the user only needs to look at one specific target on the electronic display 235. Alternatively, the system 300 captures images when the user is viewing content displayed on the VR headset 105 in a normal mode of operation.

The eye tracking system 300 identifies 640 the shape of the eye's pupil 316 based on the captured one or more images. When the eye is viewing content such that the optical sensor 366 is on-axis (i.e., along the pupillary axis 520 of the eye), the pupil shape is captured as a circle in the images captured by the optical sensor 366. When the eye is viewing content such that the optical sensor 366 is off-axis (i.e., not along the pupillary axis 520 of the eye), the pupil shape is approximated as an ellipsoid. In one embodiment, the pupil shape is identified by processing a single captured image. For example, the shape of the pupil can be identified by determining the border between the pupil and the iris by looking for a change in reflected intensity of various wavelengths of light associated with the pupil and iris of the eye. The pupil is typically black in color and the iris is typically one of brown, hazel, green, gray, or blue. As the pupil is an opening within the iris region, a shape of the pupil can be identified by observing a border between the black pupil and a different reflected intensity at one or more light wavelengths associated with the iris region. Alternatively, the pupil shape is identified by processing the diffuse illumination corresponding to a plurality of captured images.

In one embodiment, the identified pupil shape is modified to correct for refractive distortion of the cornea. For example, the correction for the cornea's refractive distortion can initially be implemented based on a typical human eye (e.g., based on empirical data) and can later be learned more accurately for the particular eye of the user. In some embodiments, the cornea may be approximated as a sphere with a typical index of refraction for human corneas (e.g., 1.377). The pupillary 3D plane 515 may be assumed to be located at a typical distance behind the corneal surface 510 (e.g., 3 mm). The radius of the corneal sphere 310 and distance to the corneal surface 310 may be known via corneal tracking described above in conjunction with FIGS. 3 and 4. For a given point in the image plane determined to be on the edge of the pupil 316, a ray may be found that passes through this point when refracted by the cornea of known shape, distance, and assumed index of refraction. The refracted ray then travels an additionally assumed distance to strike the pupil 3D plane 515 at the location of the actual pupil border. In other implementations, the corneal index of refraction and distance to pupil plane may be measured during calibration or learned over course of use.

The eye tracking system 300 identifies 650 a 3D plane 515 that the pupil resides in by first correcting the pupil edge shape aberrations in image sensor space caused by camera distortion and corneal refraction, then finding the best projection onto a plane to yield an at-rest pupil shape (ex. a circle).

The eye tracking system 300 determines 660 a pupillary axis (e.g., pupillary axis 520) for the eye, where the pupillary axis 520 is derived by identifying a ray originating from the pupil's 3D plane and is perpendicular to a surface of the corneal sphere 310 of the eye. Because the pupil's 3D plane (e.g., plane represented by line 515) is offset from the center of the corneal sphere (e.g., point 311), there is a single ray that is originating from the pupil's 3D plane and is perpendicular to a surface of the corneal sphere 310 of the eye.

In one embodiment, the determined pupillary axis 520 is used to determine an angular offset between the pupillary axis 520 and the eye's true line of sight that is represented by the position of the center 530 of the eye's foveal centralis region. One example method of determining the angular offset is to ask the user to fixate on a target that is located at a known position on the VR headset 105's display, and then measure the angular delta between the pupillary axis (i.e., pupillary axis 520 adjusted for a predicted amount of rotation the user's eye undergoes when fixating on the presented target) and the line of sight to the presented target. The measured angular delta represents an angular offset between the pupillary axis 520 and the eye's true line of sight.

The eye tracking system 300 performs 670 one or more optical actions based in part on the determined pupillary axis 520 and/or the angular offset. Example optical actions include determining a user's gaze direction, a user's vergence angle (or vergence depth), a user's accommodation depth, identification of the user, and eye's torsional state, or some combination thereof. For example, a determination of where the user is looking at (i.e., user's gaze) can be made by capturing an image of the pupil while the user is viewing in a particular direction. As described above, the eye tracking system 300 can compare the captured pupil image to that of the images of the pupil learning model and using the obtained eye model information can estimate the user's gaze. Other example actions such as identification of the user and eye's torsional state can be determined by tracking the iris of the eye. For example, a user's iris (e.g., for one or more eyes) can be captured in an image and can be stored in memory (e.g., at VR headset 105, VR console 110, or on the cloud). The stored iris image can later be used for identifying the user by comparing it with a later captured iris image. Some of the example optical actions might require captured corneal reflection data and/or calibration data (e.g., pupillary axis and/or angular offset to true light of sight) of both the user's eyes to perform the optical actions, and one or more steps of the example processes 400 and/or 600 may be implemented (either concurrently or sequentially) with respect to the user's other eye to perform such optical actions.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    obtaining cornea information for an eye of a user, the cornea information including a radius of a corneal sphere of the eye and location of a center of the corneal sphere;
    capturing one or more reflections of a pupil of the eye of the user while the user is viewing content displayed on a head-mounted display (HMD);
    determining a shape of the pupil based on the one or more captured pupil reflections;
    identifying a three-dimensional plane parallel to the pupil, the three-dimensional plane identified based on the obtained cornea information and the identified pupil shape;
    identifying a ray originating from the three-dimensional plane and perpendicular to a surface of the corneal sphere;
    determining a pupillary axis for the pupil of the user based on the identified ray; and
    performing an optical action based in part on the determined pupillary axis.

2. The method of claim 1, further comprising:
    identifying a foveal centralis region of the eye of the user;
    determining a second ray originating from the foveal centralis region of the eye and passing through the pupil corresponding to a true line of sight of the user; and
    determining an angular offset between the determined pupillary axis for the pupil of the user and the true line of sight of the user.

3. The method of claim 1, wherein the cornea information for the eye of the user is obtained by:
    capturing one or more reflections of a corneal surface of the eye of the user, the one or more reflections captured while the corneal surface is reflecting light originating from at least two illumination sources positioned at known locations; and
    updating a model of the eye including the radius of the corneal sphere of the eye and the location of the center of the corneal sphere of the eye, the model determined based on the captured one or more reflections of the corneal surface and the known locations of the at least two illumination sources.

4. The method of claim 1, wherein determining the shape of the pupil based on the one or more captured pupil reflections includes:
    determining, from the one or more captured pupil reflections, a border between the pupil and an iris of the eye based on a change in reflected intensity of one or more wavelengths of light; and
    identifying the shape of the pupil from the determined border.

5. The method of claim 1, further comprising:
    modifying the pupil shape for the user to correct for refractive distortion caused by the corneal sphere of the user.

6. The method of claim 1, wherein the optical action is selected from the group comprising: determining a gaze direction of the user, determining a vergence angle of the eye of the user, determining the vergence depth of the user, determining an accommodation depth for the user, performing user identification, determining a torsional state of the eye of the user, or some combination thereof.

7. The method of claim 1, wherein the content displayed by the HMD being viewed by the user includes a known calibration target displayed on an electronic display of the HMD.

8. A head mounted display (HMD) comprising:
    an eye tracking system including:
        two or more illumination sources configured to illuminate an eye of a user,
        a detector configured to capture light reflected from at least one of a cornea or a pupil of the eye of the user as an image, and
        a control module configured to:
            obtain cornea information for an eye of a user, the cornea information including a radius of a corneal sphere of the eye and location of a center of the corneal sphere,
            illuminate the eye of the user with light from the two or more illumination sources,
            capture, at the detector, one or more reflections of the pupil of the eye of the user while the user is viewing content displayed by the HMD,
            determine a shape of the pupil based on the one or more captured pupil reflections;
            identify a three-dimensional plane parallel to the pupil, the three-dimensional plane identified based on the obtained cornea information and the identified pupil shape;
            identify a ray originating from the three-dimensional plane and perpendicular to a surface of the corneal sphere;
            determine a pupillary axis for the pupil of the user based on the identified ray; and
            perform an optical action based in part on the determined pupillary axis.

9. The HMD of claim 8, wherein the cornea information for the eye of the user is obtained by:
    capturing one or more reflections of a corneal surface of the eye of the user, the one or more reflections captured while the corneal surface is reflecting light originating from at least two illumination sources positioned at known locations; and
    updating a model of the eye including the radius of the corneal sphere of the eye and the location of the center of the corneal sphere of the eye, the model determined based on the captured one or more reflections of the corneal surface and the known locations of the at least two illumination sources.

10. The HMD of claim 8, wherein the two or more illumination sources are part of the electronic display.

11. The HMD of claim 8, wherein determining the shape of the pupil based on the one or more captured pupil reflections includes:
    determining, from the one or more captured pupil reflections, a border between the pupil and an iris of the eye based on a change in reflected intensity of one or more wavelengths of light; and identifying the shape of the pupil from the determined border.

12. The HMD of claim 8, wherein performing the one or more optical actions comprises performing an action selected from a group consisting of: determining a user's vergence angle, determining a user's accommodation depth, identifying the user, determining an eye's torsional state, or some combination thereof.

13. The HMD of claim 8, wherein the control module is further configured to:
identify a foveal centralis region of the eye of the user;
determine a second ray originating from the foveal centralis region of the eye and passing through the pupil corresponding to a true line of sight of the user; and
determine an angular offset between the determined pupillary axis for the pupil of the user and the true line of sight of the user.

14. A head mounted display (HMD) comprising:
an electronic display configured to display images to the user;
an optics block configured to magnify light received by the optics block from the electronic display; and
an eye tracking system including:
two or more illumination sources configured to illuminate an eye of a user,
a detector configured to capture light reflected from at least one of a cornea or a pupil of the eye of the user as an image, and
a control module configured to:
obtain cornea information for an eye of a user, the cornea information including a radius of a corneal sphere of the eye and location of a center of the corneal sphere,
illuminate the eye of the user with light from the two or more illumination sources,
capture, at the detector, one or more reflections of the pupil of the eye of the user while the user is viewing content displayed by the HMD,
determine a shape of the pupil based on the one or more captured pupil reflections;
identify a three-dimensional plane parallel to the pupil, the three-dimensional plane identified based on the obtained cornea information and the identified pupil shape;
identify a ray originating from the three-dimensional plane and perpendicular to a surface of the corneal sphere;
determine a pupillary axis for the pupil of the user based on the identified ray;
identify a foveal centralis region of the eye of the user;
determine a second ray originating from the foveal centralis region of the eye and passing through the pupil corresponding to a true line of sight of the user;
determine an angular offset between the determined pupillary axis for the pupil of the user and the true line of sight of the user; and
perform an optical action based in part on the angular offset between the determined pupillary axis for the pupil of the user and the true line of sight of the user.

15. The HMD of claim 14, wherein the two or more illumination sources are positioned relative to one another such that the detector is able to capture one or more images of the two or more illumination sources based on the light reflected from the cornea or the pupil.

16. The HMD of claim 14, wherein performing the one or more optical actions comprises performing an action selected from a group consisting of: determining a user's vergence angle, determining a user's accommodation depth, identifying the user, determining an eye's torsional state, or some combination thereof.

17. The HMD of claim 14, wherein the two or more illumination sources are part of the electronic display.

18. The HMD of claim 14, wherein the cornea information for the eye of the user is obtained by:
capturing one or more reflections of a corneal surface of the eye of the user, the one or more reflections captured while the corneal surface is reflecting light originating from at least two illumination sources positioned at known locations; and
updating a model of the eye including the radius of the corneal sphere of the eye and the location of the center of the corneal sphere of the eye, the model determined based on the captured one or more reflections of the corneal surface and the known locations of the at least two illumination sources.

19. The HMD of claim 14, wherein determining the shape of the pupil based on the one or more captured pupil reflections includes:
determining, from the one or more captured pupil reflections, a border between the pupil and an iris of the eye based on a change in reflected intensity of one or more wavelengths of light; and
identifying the shape of the pupil from the determined border.

20. The HMD of claim 14, wherein the control module is further configured to:
modify the pupil shape for the user to correct for refractive distortion caused by the corneal sphere of the user.

* * * * *